United States Patent [19]
Heidecker et al.

[11] 3,959,823
[45] May 25, 1976

[54] FLEXIBLE DISC RECEIVER USING A TRAY WHICH IS WITHDRAWN FROM A CARTRIDGE

[75] Inventors: Robert F. Heidecker, Longmont; Albin Kenneth Johnson, Arvada; Galen B. Royer, Boulder, all of Colo.

[73] Assignee: Dynastor, Inc., Denver, Colo.

[22] Filed: Nov. 18, 1974

[21] Appl. No.: 524,807

[52] U.S. Cl. ................................ 360/99; 206/444; 346/137; 360/86; 360/133
[51] Int. Cl.² ................. G11B 5/016; G11B 17/04; G11B 23/04; G11B 25/04
[58] Field of Search ............... 360/99, 133, 86, 135, 360/97–98, 60, 137; 206/312–313; 346/137

[56] References Cited
UNITED STATES PATENTS

| | | | |
|---|---|---|---|
| 3,609,722 | 9/1971 | Zenzefilis | 360/97 |
| 3,662,360 | 5/1972 | Lambert | 360/133 |
| 3,678,481 | 7/1942 | Dalziel et al. | 360/133 |
| 3,815,150 | 6/1974 | Stoddard et al. | 360/133 |
| 3,833,926 | 9/1974 | Hall | 360/135 |
| 3,845,502 | 10/1974 | Paus | 360/86 |

*Primary Examiner*—Alfred H. Eddleman
*Attorney, Agent, or Firm*—Reilly and Hancock

[57] ABSTRACT

Cartridges containing a tray retained flexible disc with the tray locked to the cartridge housing are accepted so that the tray is unlocked and withdrawn from the cartridge housing into an operating position internal to a receiver. The cartridge housing is held in a relatively fixed position so that it cannot be removed from the receiver unless the tray has been properly returned to the cartridge housing and again locked therein. The flexible disc is automatically clamped into a spindle arrangement and rotary motion applied thereto when a detector indicates that the disc is in the proper operating position. The tray is returned to the cartridge housing in essentially a reverse sequence from the loading operaton but with additional means for insuring that the disc has stopped rotation prior to return to the tray and is properly seated on the tray prior to its return to the cartridge housing.

26 Claims, 21 Drawing Figures

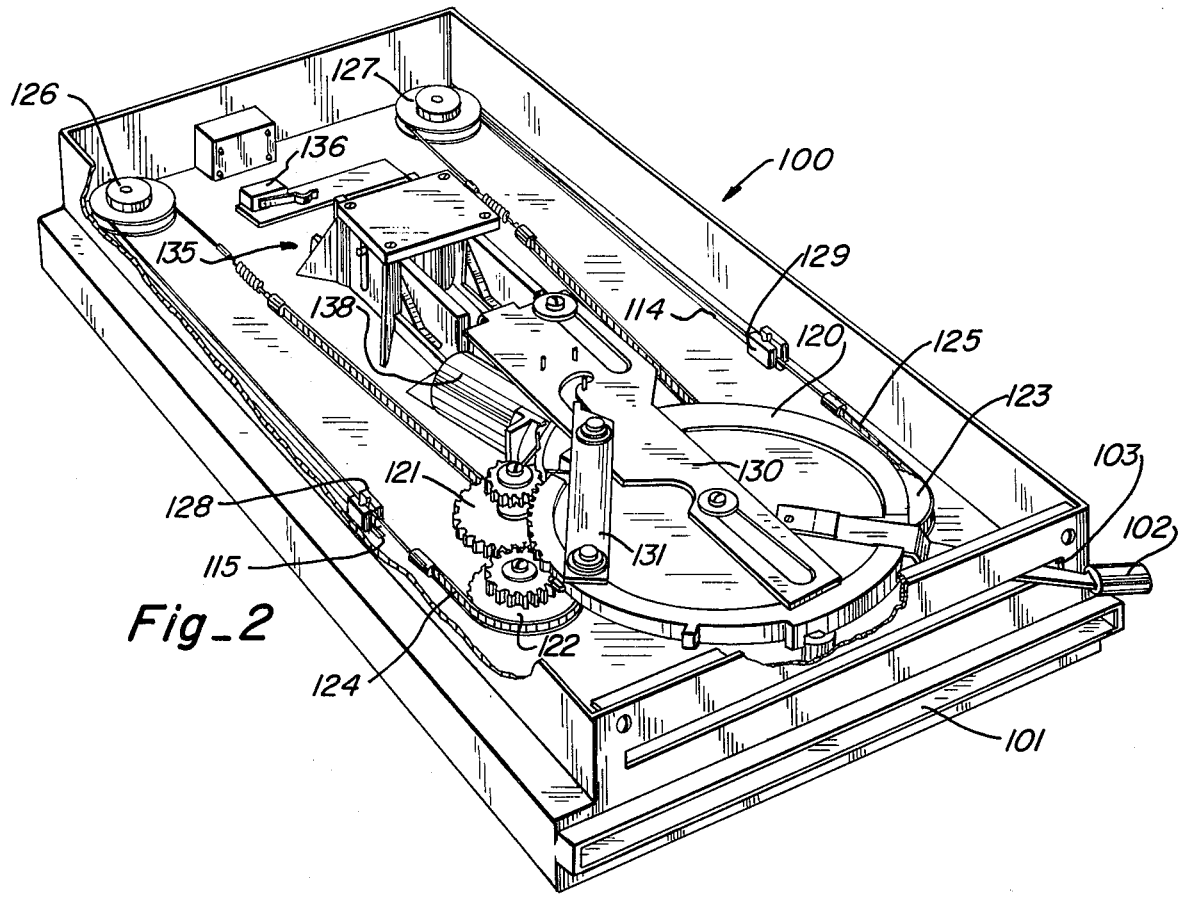
Fig_2
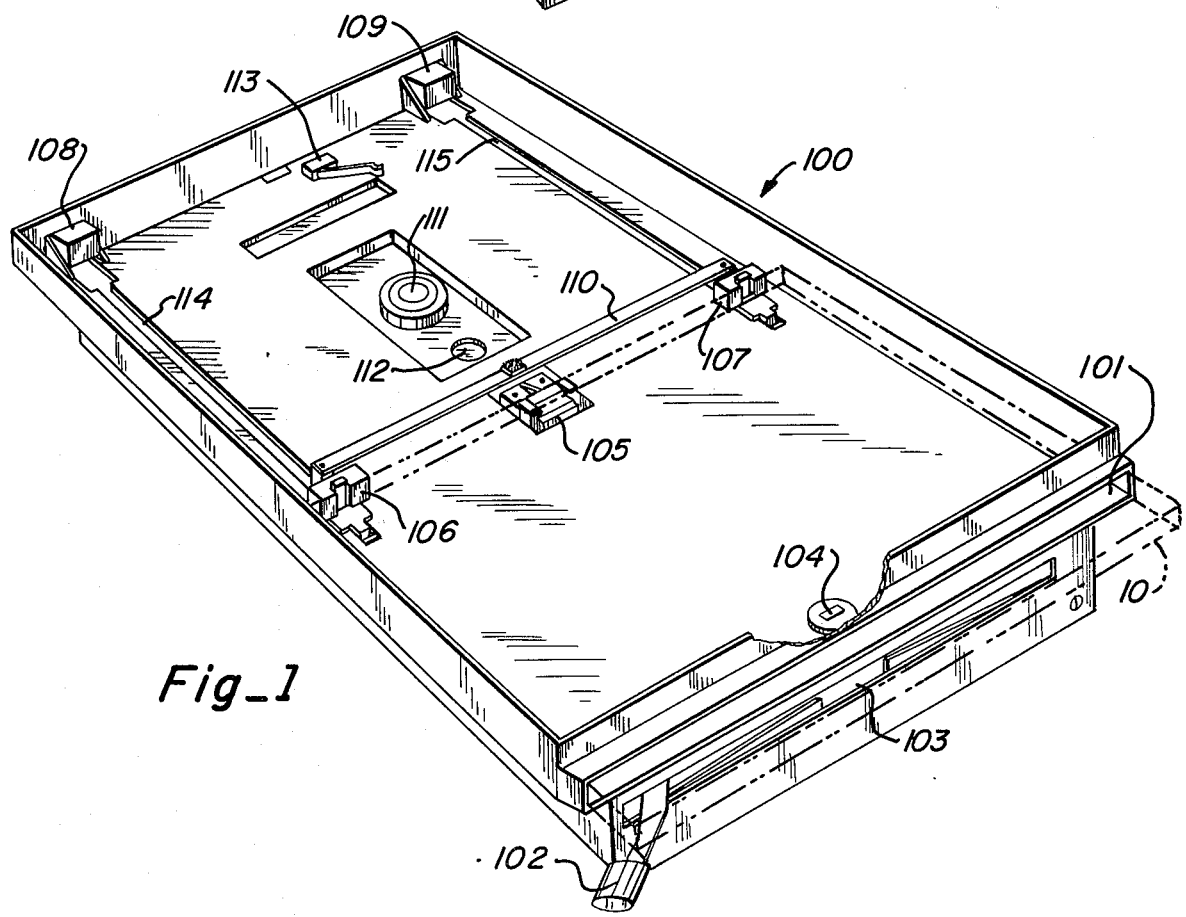
Fig_1

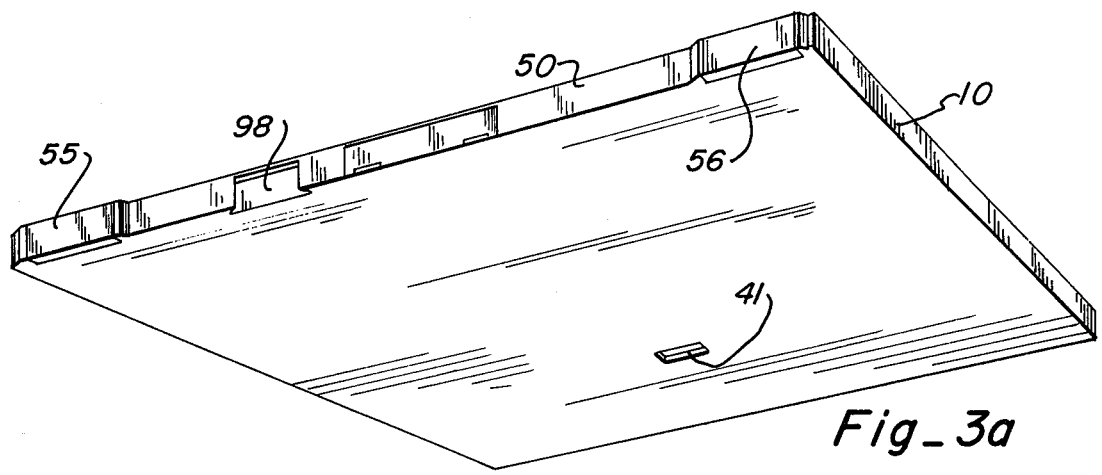
*Fig_3a*
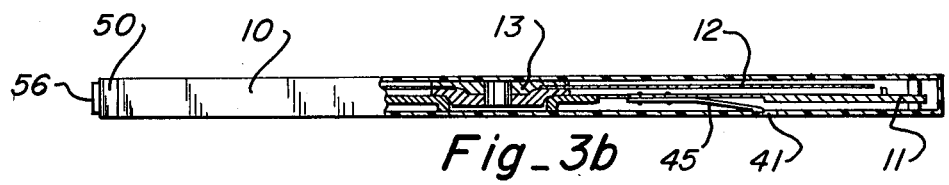
*Fig_3b*
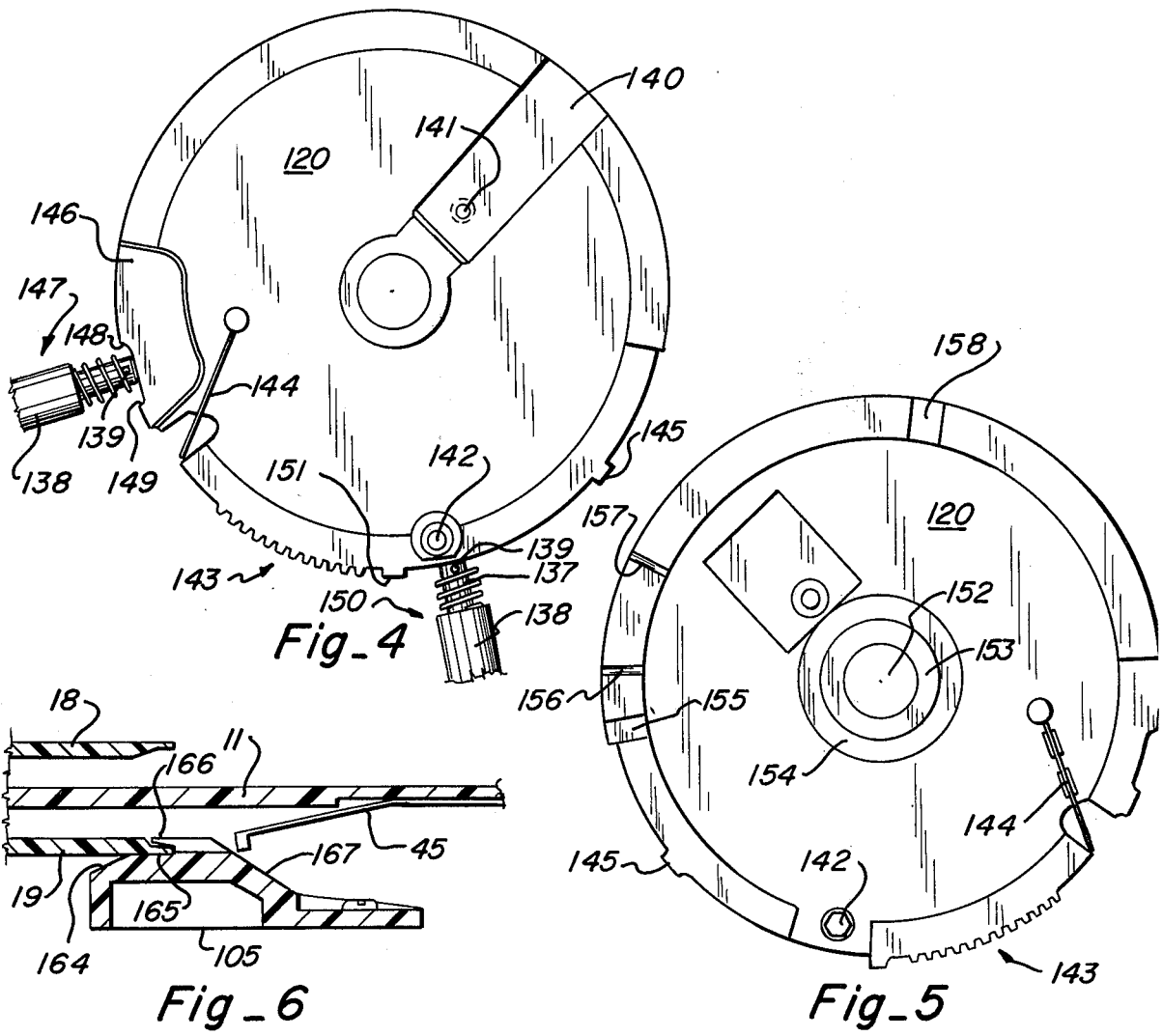
*Fig_4*
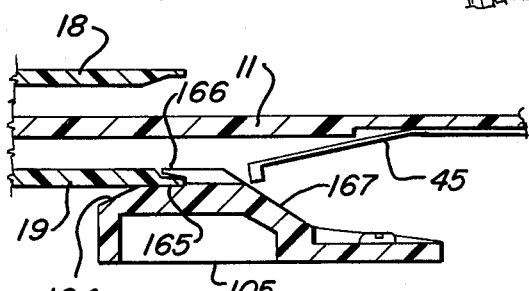
*Fig_6*
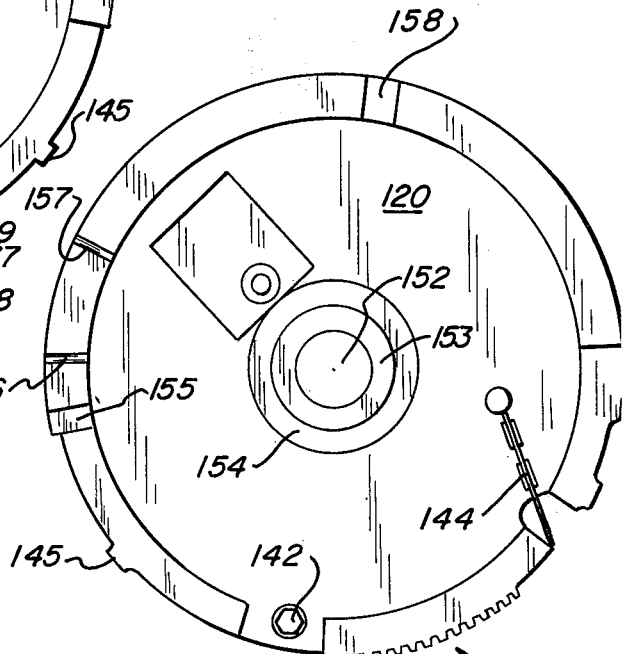
*Fig_5*

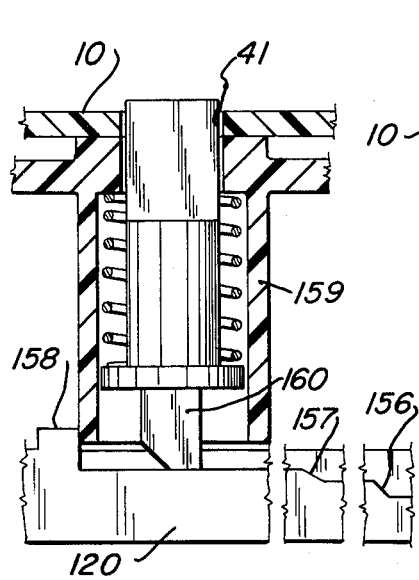
Fig_9
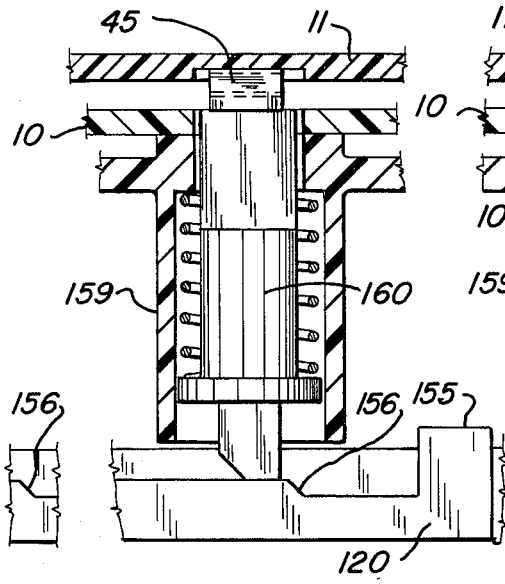
Fig_8
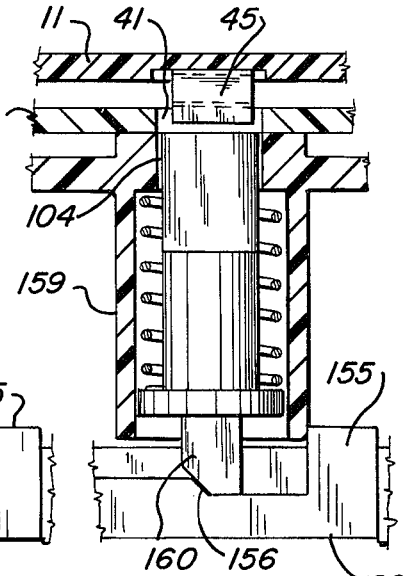
Fig_7
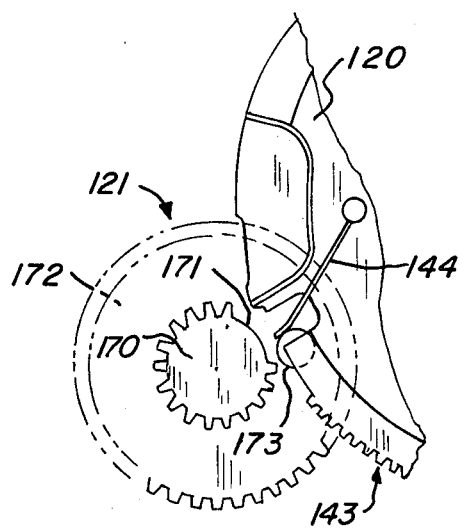
Fig_10
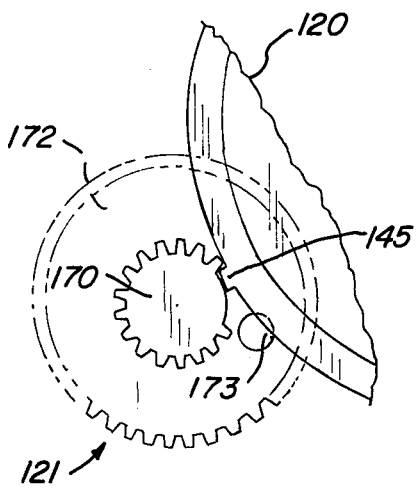
Fig_11

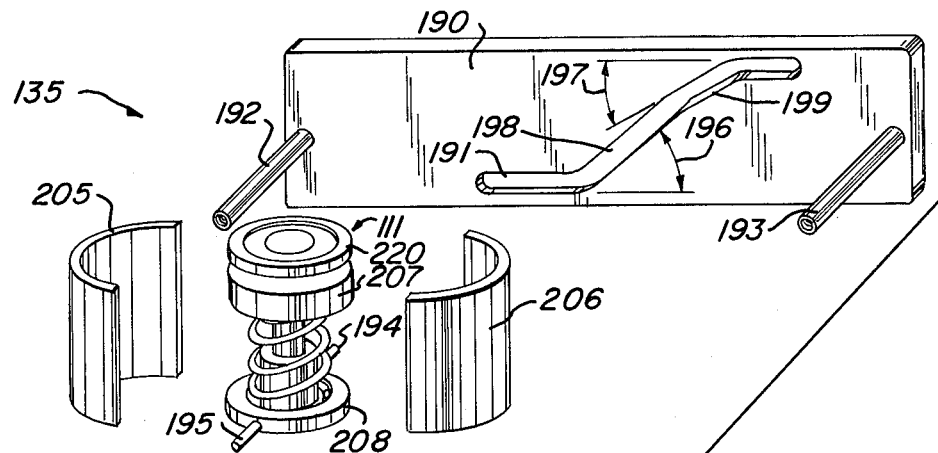
Fig_15
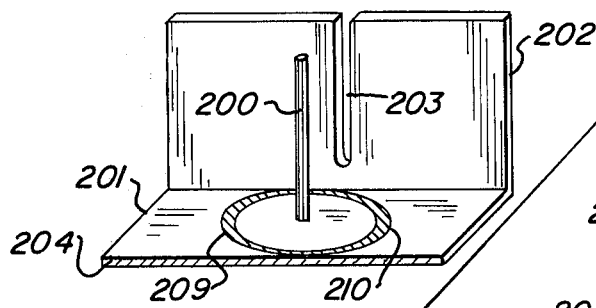
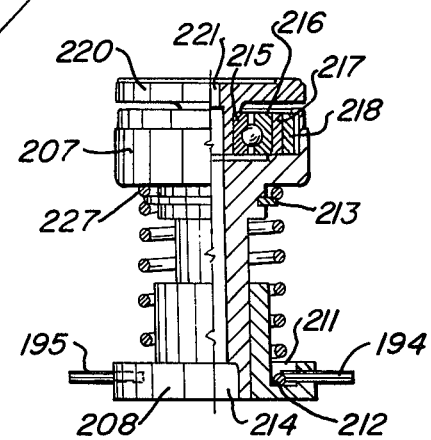
Fig_16
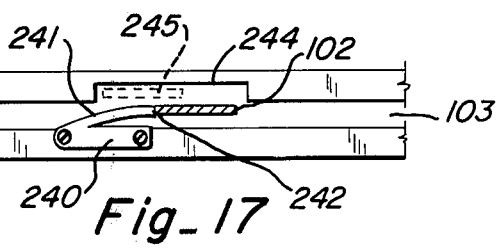
Fig_17
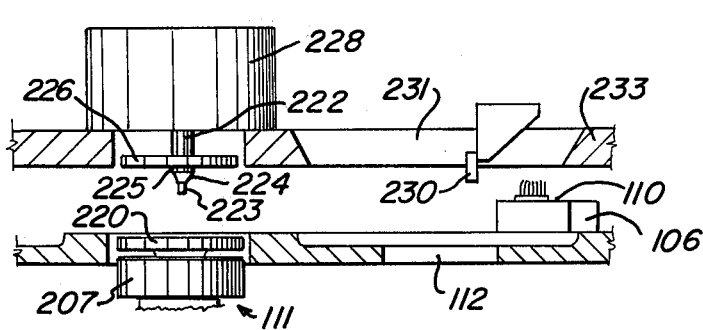
Fig_18
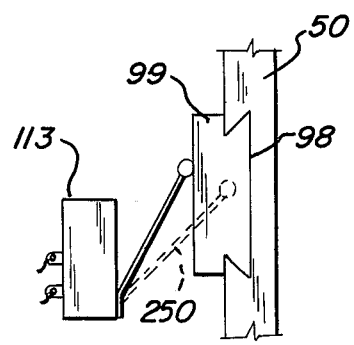
Fig_19

FLEXIBLE DISC RECEIVER USING A TRAY WHICH IS WITHDRAWN FROM A CARTRIDGE

CROSS REFERENCE TO RELATED APPLICATIONS

Copending application Ser. No. 464,054 entitled "Flexible Disc Recording Apparatus" by R. F. Heidecker et al which was filed on Apr. 25, 1974, and which is assigned to the same assignee of this application is directed to apparatus for controlling a read-write head relative to a flexible disc and also control of the air bearing for such a disc. The Heidecker et al application discloses flexible disc handling apparatus particularly useful in conjunction with the invention shown and described in this application.

Copending application Ser. No. 518,278 entitled "Flexible Disc Cartridge" by R. F. Heidecker et al which was filed on Oct. 29, 1974 and which is also assigned to the same assignee as this application is directed to the structure of a flexible disc cartridge which is well suited for handling by the disc drive receiver described in this application.

BACKGROUND OF THE INVENTION

This invention relates to apparatus and methods for handling flexible or "floppy" discs. More particularly, this invention relates to apparatus for cooperating with a cartridge which contains a tray mounted flexible disc so that the disc can be automatically located in an operating position free of potential contamination. Although not specifically limited thereto, the present invention is particularly useful for providing the method and means for interfacing a flexible disc between a secured environment type of cartridge and apparatus for reading and writing digital data upon the disc.

The data processing industry has shown increased interest in using flexible discs as a data storage means such as for program loaders, satellite or mass memories, data entry buffers and the like. Such discs have been particularly attractive since they can store relatively large amounts of data in small volumes and further are well suited for transfer from one location to another. These discs have also been seriously considered for many computer systems since it has generally been believed that they could be manufactured at a relatively low cost. Various configurations have been developed for contact and non-contact data retrieval and recording relative to such discs.

The discs which are of extremely thin plastic base with a magnetic oxide coating are spun at relatively high speeds and means employed for retaining the disc in a substantially stable fixed plane. A particularly advantageous system for controlling such a rotating disc is shown in the above mentioned copending application Ser. No. 464,054 which shows an arrangement for providing a fixed disc plane relative to a flat plate by a controlled air bearing.

As the density of data recorded on these discs has increased, the problems stemming from contamination of various sorts has become increasingly critical. Typical prior art cartridges used slots for admitting a rotating spindle and the read-write head through the envelope of the cartridge housing. The disc is spun within the cartridge. Unfortunately, the openings through the cartridge housing and the difficulty in maintaining disc orientation within the cartridge have tended to degrade the performance of such discs especially over extended periods of time. Further, the protection of the cartridge housing can be easily lost by accidental or intentional removal of the disc from the cartridge. It has been found that handling of the discs can render them useless as data recording devices through folding, smudging or mere exposure to ambient conditions. Thus, there is a need for a flexible disc storing cartridge which will protect the cartridge from ambient conditions as well as direct handling and a further need for a disc drive receiver which can cooperate with such a cartridge so that it can be automatically utilized for its intended purpose.

SUMMARY OF THE INVENTION

The present invention provides a disc drive receiver apparatus and method for cooperating with a cartridge which contains a disc mounted on a tray in a locked arrangement therein. More particularly, the present invention provides a method and apparatus for sequentially cooperating with a protective storage cartridge so that the disc retaining tray can be removed from within the cartridge housing and the disc properly located for rotation and information exchange operations with other apparatus. As will be discussed in greater detail, one embodiment of this invention employs a mechanical arrangement with controlled timing sequences for extracting the disc from the storage cartridge and properly interfacing it with information exchanging apparatus. The tray is automatically unlocked from the cartridge housing, the cartridge housing is retained in place and the tray withdrawn into the receiver to an appropriate operating position. The mechanism is arranged so that discrete phases of loading are accomplished in sequence. The method and apparatus of this invention are likewise reversible for returning the disc to its storage tray, returning the tray into the housing of the cartridge and locking the tray in place before releasing the cartridge for removal from the receiver.

Because of the lack of rigidity for the flexible discs, the unloading sequence includes one or more additional steps. For instance, rotation of the disc must be stopped before release of the spindle and the present invention contemplates providing a delay for insuring that such rotation has ceased. Yet another delay is included to insure that the disc has settled onto the tray after the hub on which it is mounted is returned to its nesting position on the tray since such discs have a tendency to demonstrate an umbrella effect in following movement of their mounting hub in a direction perpendicular to the plane of rotation.

Yet another problem encountered with disc systems relates to the accumulation of small particles on the read-write head. The present invention further includes an arrangement for automatically sweeping the head each time that a disc is loaded or unloaded for removing such loose contamination. The mechanism and method which will be described for the preferred embodiment is particularly advantageous since the apparatus involved can be manufactured with low tolerances and relatively simple procedures using low cost components. One embodiment will be described as a manually actuated apparatus but can be easily implemented with a single drive motor for automatic push button operation. In addition, the load and unload sequences are well suited for implementation through electronic analogies as will be illustrated in another embodiment.

It is an object of the present invention to provide a method and apparatus for interfacing a flexible disc between information handling apparatus and an environment controlling storage cartridge.

Another object of this invention is to provide a method and means for transporting a flexible disc cartridge from a locked position within a storage cartridge to a location wherein spinning operations can be performed without requiring direct handling of the disc.

A further object of this invention is to provide an apparatus and method well adapted for low tolerance and low cost manufacturing but with high reliability of flexible disc handling between a cartridge and information exchanging apparatus.

A still further object of this invention is to provide a method and means for interfacing a flexible disc between a cartridge and information exchanging apparatus in a manner which insures reliability by accommodating the mechanical characteristics of the flexible disc.

Yet another object of this invention is to provide a method and means for interfacing a disc from a storage cartridge to information exchanging means in a manner which permits a controlled environment for the disc throughout such operations.

In addition to the foregoing, other objects, features and advantages of the present invention will be more readily apparent in view of the following discussion of the preferred embodiment.

BRIEF DESCRIPTION OF THE DRAWINGS

FIG. 1 is a perspective view showing the disc cartridge interfacing elements involved in one preferred embodiment of this invention.

FIG. 2 is a perspective view of the reverse side of the FIG. 1 apparatus.

FIGS. 3A and 3B show a flexible disc storing cartridge which is particularly well suited for cooperating with the present invention.

FIG. 4 shows a top plan view of a sector gear used in the embodiment of FIGS. 1 and 2.

FIG. 5 shows a bottom plan view of the sector gear.

FIG. 6 is a view of the cartridge housing catch of FIG. 1.

FIGS. 7–9 show the interrelationship of a follower pin for unlocking the disc tray and retaining the disc cartridge housing in place.

FIG. 10 illustrates the interrelationship between the sector gear and a combination gear in the unload position.

FIG. 11 shows the relationship of the sector gear and the combination gear for the fully loaded position.

FIG. 15 is an exploded view of the movable spindle and its camming and retaining apparatus.

FIG. 16 is a partially sectioned view of the movable spindle housing.

FIG. 17 shows the arrangement for providing a delay in the manual unloading operation.

FIG. 18 is a section view showing typical interrelationships between the receiver and the disc utilizing apparatus and particularly showing the head cleaning brush and upper and lower spindle apparatus as well as the head cleaning access.

FIG. 19 shows an arrangement for detection of the presence or absence of a write protect tab.

DETAILED DESCRIPTION OF THE PREFERRED EMBODIMENT

Figure 14:
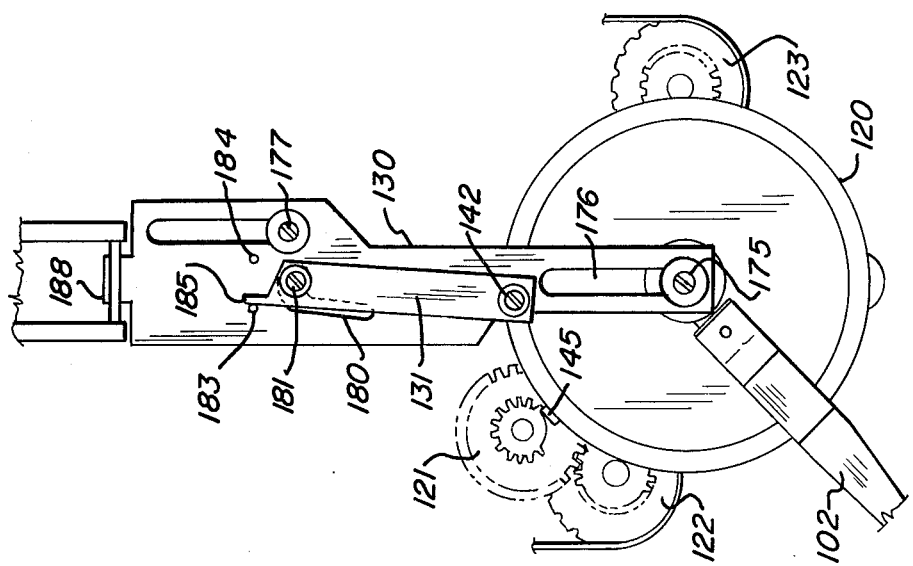
FIGS. 12–14 show the rotary to linear motion converter and operation timing sequence.

The preferred embodiment of this invention as will now be described for FIGS. 1–19 illustrates apparatus for implementing this invention using manually actuated mechanical elements. However, it will be readily understood that other mechanical apparatus can be substituted and the mechanical analogies can be implemented in whole or in part through electronic circuitry by those having normal skill in the art without departing from the spirit of this invention. The preferred embodiment is shown with configurations particularly well suited for interfacing with a flexible disc cartridge as has been shown in our copending application entitled "Flexible Disc Cartridge". Since there are only minor differences between the cartridge shown in this application as compared to the aforementioned application, common reference numerals from the copending application will be used herein relative to that cartridge wherever practical to do so.

The disc drive receiver of this invention is shown generally in FIG. 1 with the apparatus for cooperating with the operating disc having been removed. That is, the apparatus for spinning the disc and locating the read-write head relative to the disc would typically be mounted on a plate on the top of FIG. 1, this interrelationship being generally shown in FIG. 18 hereof as well as in both of our copending applications which were specifically cross-referenced above in this application. Receiver 100 has a slot 101 on the front which is arranged for receiving cartridge 10 as is generally illustrated in FIG. 1. In this particular embodiment, a handle 102 is arranged for movement within slot 103, the movement of this handle 102 in one direction in slot 103 causing the apparatus to automatically unload and correctly position the disc within the receiver while opposite direction of movement causes automatic reloading of the disc into the cartridge 10.

Arm 102 as shown in FIGS. 1 and 2 is positioned in the unload location. As seen in FIG. 1, movement of handle 102 across slot 103 first causes a follower pin to be raised in slot 104. This unlocks the tray from within the cartridge and retains the exterior cartridge housing from further movement. An additional catch 105 is arranged to hold the lower surface of the cartridge housing in place and permit the tray to be withdrawn. As illustrated in the exemplary embodiment shown, U-shaped magnets are loosely mounted in assemblies 106 and 107 to engage clips on the exterior elongated edge of cartridge 10. After the retaining and unlocking pin has been raised through slot 104, further movement of handle 102 causes magnetic clips 106 and 107 to withdraw the tray from the cartridge until the magnets 106 and 107 have reached resilient stop pads 108 and 109. Slots 114 and 115 in the surface of receiver 100 guide the lateral movement of magnets 106 and 107. This lateral movement of magnets 106 and 107 also causes brush retaining arm 110 to sweep loose contaminants from the read-write head as will be described more fully later. As the tray reaches a desired operating position, a spindle 111 is raised from the floor of 100 so as to properly position the disc for rotation and information exchange purposes. Access port 112 through the receiver permits further cleaning of the read-write head when required. Microswitch 113 is positioned so as to detect the presence or absence of an insert which will permit or prevent writing data on the disc.

The major elements of the mechanism being described for this exemplary embodiment and their general operating interrelationships are illustrated in perspective view FIG. 2 of the bottom of receiver 100. Handle 102 is attached to sector gear 120 so that it can be slightly flexed upward from the plane of gear 120 as seen in FIG. 2 but also will impart rotary motion to sector gear 120 as it is moved through slot 103. As will be described in detail for FIGS. 7–9 later, initial movement of handle 102 causes a pin to release the tray locking catch within cartridge 10 and also to retain the cartridge housing in place. Further movement of handle 102 causes a segment of teeth on gear 120 to engage teeth on combination gear 121 which then causes ladder chain drive gears 122 and 123 to rotate. The lower portion of gears 122 and 123 have a sprocket arrangement to pull chain and wire belt drive combinations 124 and 125, respectively, around idler pullies 126 and 127 and thus move attached blocks 128 and 129 so as to cause the magnet mount assemblies 106 and 107 to be withdrawn along slots 114 and 115. Note that chain drive gear 123 is driven by combination gear 121 by an idler gear mounted for free rotation on the same shaft as sector gear 120, this idler gear not being visible in FIG. 2 but being a conventional direct gear transfer between 121 and 123. Thus chain drive gears 122 and 123 rotate at identical speeds so that magnets 106 and 107 are moved in parallel with one another.

Figure 13:
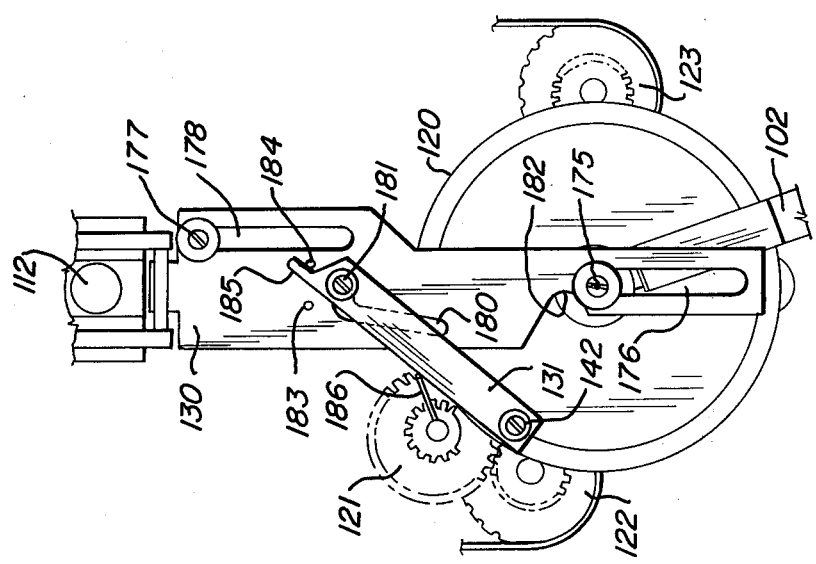
Figure 12:
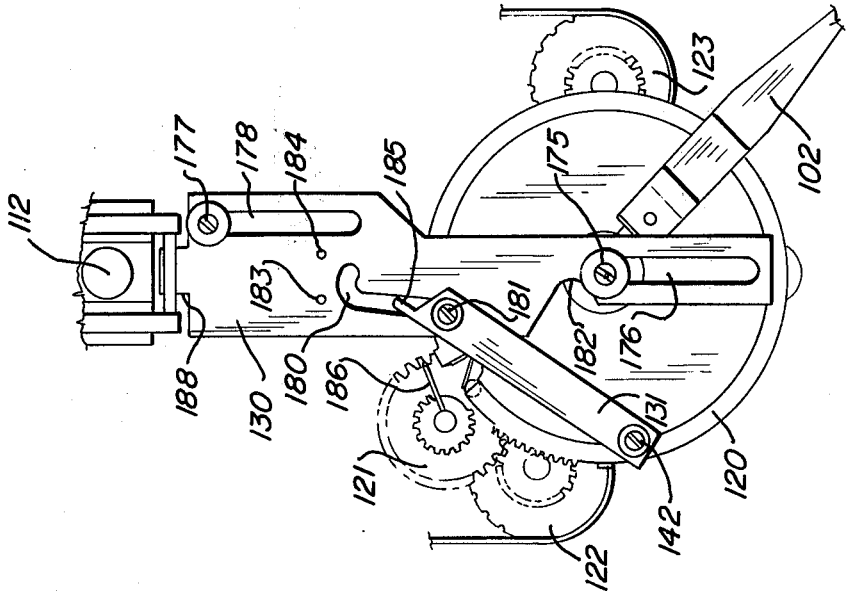

As will be more fully understood from the description of FIGS. 12–14, continued movement of handle 102 in slot 103 after the gear teeth segment on 120 has rotated combination gear 121 causes push bar 130 to begin linear movement in response to movement of crank arm 131. This linear motion is impart to an assemblage of cam plates shown generally at 135 which will raise the spindle 111 shown in FIG. 1. The completion of the linear movement of cam assembly 135 is detected by microswitch 136 which then enables the application of rotary power to the disc apparatus.

Solenoid 138 is arranged to cooperate with secor gear 120 so as to provide several interlock operations. More particularly, after the disc has been fully loaded into receiver 100 and microswitch 136 actuated, solenoid 138 will engage a groove along the periphery of sector gear 120 so as to permit movement of cam block assembly 135 out of an actuating position relative to microswitch 136 but without sufficient linear movement to lower the spindle 111. By means not shown, a conventional timeout arrangement then will continue to cause solenoid 138 to prevent further movement of sector gear 120 until the disc rotation has completely stopped. At that point, solenoid 138 is actuated so as to remove the impediment to further rotation of sector gear 120 so that the disc can be returned to the tray. Thus the rotation of sector gear 120 in the reverse direction is allowed although a brief mechanical impediment as is discussed in conjunction with FIG. 17 prevents return of the tray to the cartridge housing until a sufficient length of time has passed to insure that the disc is properly seated on the tray. Solenoid 138 also cooperates with sector gear 120 so as to prevent loading of the tray into the receiver in the event that power is not available for the disc drive. Accordingly, solenoid 138 is normally actuated so as to be free of sector gear 120 but, when deactuated, either prevents loading of the disc into the receiver if power is not available or prevents release of the disc spindles until the discs have stopped rotating.

The present invention is particularly well suited for cooperating with a cartridge as is generally shown in FIG. 3. This cartridge has been described in considerable detail in our copending application entitled "Flexible Disc Cartridge", but will briefly be reviewed here for background. The reference numerals contained in FIGS. 3a and 3b are common with those used in the aforementioned application.

Cartridge housing 10 is arranged to retain a tray 11 which has an elongated outer edge 50 on which are mounted magnetic plates 55 and 56 for interfacing with magnets 106 and 107. It should be noted that magnets 106 and 107 are mounted in their carrier assembly so as to permit some degree of rotation thereby allowing them to align themselves with the surfaces of plates 55 and 56. The tray 11 retains the disc 12 by means of hub 13 which nests within a bore in tray 11, hub 13 being dimensioned so that the interior surfaces of cartridge housing 10 will retain disc 12 on the tray without lateral movement within the cartridge. A spring-loaded arm 45 cooperates with a slot 41 through the cartridge housing to lock the tray within the housing when it is exterior to receiver 100. The operating interrelationship between cartridge 10 and tray 11 along with disc 12 will be more fully understood as this detail description is further developed.

FIG. 4 shows an upper plan view of the sector gear 120. A groove 140 is formed in the upper surface of sector gear 120 with pin 141 arranged so as to mount handle 102. Pin 142 extends upwardly from the surface of gear 120 to rotatably mount one end of crank bar 131. Gear tooth segment 143 is arranged to engage combination gear 121 as will be described later. Spring 144 and shoulder 145 are likewise arranged to cooperate with combination gear 121 for insuring that no unintended movement of the tray removal apparatus occurs. A slight depression 146 is included in the upper surface of gear 120 to accommodate the mounting hardware on the underside of crank bar 131.

Solenoid 138 typically is mounted below sector gear 120 and includes an upwardly extending pin 139 on the movable shaft thereof. In FIG. 4, solenoid 138 is shown in two different positions for cooperation with gear 120, these two positions resulting from the rotation of gear 120 since only one solenoid 138 is actually employed. Position 147 shows the orientation of solenoid 138 relative to gear 120 when the receiver 100 is unloaded, but ready to receive a cartridge 10, as well as during the initial cartridge loading phase. Thus when gear 120 is rotated so that shoulder 148 engages pin 139, the device is completely unloaded and ready to receive cartridge 10. When gear 120 has been rotated so that pin 139 engages shoulder 149, the gear 120 is moved sufficiently to cause the follower pin to unlock the tray from within the cartridge 10 and to retain the cartridge housing in position but, because of the interference of shoulder 149 against pin 139, further loading of the disc tray 11 into the receiver 100 is prevented. This is effected by requiring that power be applied to solenoid 138 as long as it is available for the receiver to operate but, with the absence of such power, the shaft of solenoid 138 will move pin 139 inwardly to the position shown in FIG. 4.

Location 150 illustrates the orientation of solenoid 138 relative to gear 120 for the run position wherein the disc has been engaged by the spindles. That is, the location 150 of solenoid 138 as shown in FIG. 4 would be its position when the power has been applied to the spin motor and the disc rotated at full speed. Solenoid 138 is deactivated at all times that the spin motor is operating (i.e., switch 136 is closed) and also for a predetermined period thereafter as will be described. Shoulder 151 is located on gear 120 a short distance from the full run position shown. This separation permits sufficient rotation of sector gear 120 so that the run sensing switch 136 [FIG. 2] can be deactuated. By means not shown such as a conventional time-out circuit or the like, solenoid 138 is caused to be deactivated or continue to be deactivated so that pin 139 will engage shoulder 151 thus preventing further rotation of gear 120. The time-out period is for a sufficient length of time to insure that power has been removed from the rotating motor associated with the disc spindles long enough so that the disc has completely stopped rotation. At that point, solenoid 138 is reactuated and its shaft 137 withdrawn so that pin 139 no longer interferes with shoulder 151 to prevent rotation of gear 120 thereby permitting unloading of the disc and re-entry of the disc tray into the cartridge.

FIG. 5 shows a bottom plan view of sector gear 120 wherein gear tooth segment 143, spring 144 and shoulder 145 are the same as shown in FIG. 4. The central bore 152 has a column 153 extending upwardly in FIG. 5 and a shoulder 154 for accommodating a freely rotating idler gear which transfers mechanical motion from combination gear 121 to ladder chain drive gear 123 as shown in FIG. 2. Also formed on the lower surface of gear 120 in FIG. 5 are shoulders 155 and 158 which cooperate with the follower pin apparatus to be described in FIGS. 7–9 to provide full load and unload stops. In addition, cam surfaces 156 and 157 provide the means for actuating the follower pin for unlocking the cartridge tray and retaining the cartridge housing in position.

FIGS. 7–9 show the arrangement for effecting the stop limits and also the cartridge locking and unlocking operation. Housing 159 is arranged to spring retain follower pin 160 so that pin 160 is normally biased away from cartridge 10. Note that housing 159 can be formed as one piece with the main frame of receiver 100. FIG. 7 illustrates the location of pin 160 in the groove between cam surface 156 and shoulder 155 of sector gear 120 so that its upper end is below the exterior surface of cartridge 10. However, pin 160 is located such that it aligns with the slot 41 in the housing of cartridge 10 when cartridge 10 is fully inserted in slot 101. FIG. 7 corresponds to the handle position as shown in FIGS. 1 and 2. The engagement of shoulder 155 against housing 159 while the beveled edge on the end of follower pin 160 is in proximity to cam surface 156 and provides sufficient holding force so that sector gear 120 will not be unintentionally rotated. As gear 120 is initially rotated, pin 160 is urged upwardly by the first cam shoulder 156 so that it will force spring-loaded tray latch 45 upwardly clear of slot 41, this being illustrated in FIG. 8. At that point, the mechanism can then proceed to withdraw tray 11 from cartridge housing 10.

The continued rotation of sector gear 120 effects the withdrawing of tray 11 from cartridge housing 10 and ultimately second cam surface 157 urges pin 160 further into the cavity of cartridge 10, as is shown in FIG. 9. At this point, tray 11 has been sufficiently withdrawn from cartridge 10 so that there will be no interference from pin 160 but pin 160 in the FIG. 9 orientation will further insure against movement of cartridge 10 during operation of the receiver. Sector gear 120 continues rotating until shoulder 158 engages housing 159 which thus provides the fully loaded stop limit.

In briefly returning to the cartridge loading operation, it can be seen in FIG. 6 that stop 105 is arranged so that the sloped leading surface 164 will urge the lower surface 19 of cartridge 10 upwardly to be engaged by retaining tangs defining groove 165. Two spaced tangs or fingers such as 166 prevent any further upward movement of lower surface 19 for cartridge 10. The tray 11 is then withdrawn and surface 19 prevented from interfering with this operation. In addition, catch 105 has an interior sloped surface 167 which cooperates with spring latch 45 when tray 11 is being returned into cartridge 10 by urging arm 45 upward so that it will not interfere with the outer edges of surface 19, this being specifically illustrated in FIG. 6. If desired, catch 105 could be formed as one piece with the frame of receiver 100 although it can be separately formed and attached at relatively low cost.

FIG. 10 shows the detail of combination gear 121 and its operating interrelationship with sector gear 120. Combination gear 121 is formed of an upper gear section 170 which has teeth around the periphery except for gap 171. Section 170 is joined to lower gear section 172 which has gear teeth extending completely around the periphery thereof. Lower gear 172 has an upwardly extending pin 173 mounted thereon.

FIG. 10 specifically shows the position of combination gear 121 and sector gear 120 when the receiver 100 is unloaded. Under these circumstances, gear tooth sector 143 is completely clear of the teeth of gear 170. However, spring 144 extends below gear 120 and engages upwardly extending pin 173 to complete the unload travel of gear 121 and to prevent any unintended rotation of gear 121. Thus the cooperation between spring 144 and pin 173 insures that magnets 106 and 107 will be in the positions shown in FIG. 1 ready to receive the cartridge tray. It further accommodates any differences in tray load and unload travel due to backlash in the gearing and ladder chain drive.

As sector gear 120 is rotated, gear tooth segment 143 will engage the teeth of upper gear section 170 causing it to rotate and magnets 106 and 107 to be moved backwardly in slots 114 and 115 of FIG. 1. Ultimately, after continued rotation in the loading direction for gear 120, the segment 143 will pass beyond gear section 170. Although sector gear 120 performs other functions during this operation such as the raising of the disc into the operating position, gear 121 does not impart any further rotary motion to the tray removing apparatus. FIG. 11 illustrates the locking engagement of shoulder 145 on sector gear 120 against the teeth of upper gear portion 170 for combination gear 121 when the cartridge has been fully loaded and placed into the spindle engagement with the run switch 136 actuated. This interrelationship prevents any unintended movement of the tray handling apparatus during operation of the receiver 100.

FIGS. 12–14 in sequence show the operation of push bar 130 and crank arm 131 during a cartridge loading sequence. These elements are arranged so that no linear motion will be imparted to push bar 130 during the first rotational segment of 120 but will be imparted during a later phase of this rotation. More particularly, FIG. 12 illustrates the interrelationship of sector gear 120, crank arm 131 and push bar 130 when the receiver 100 is ready to accept a cartridge 10. Push bar 130 is retained so that it can only move linearly by mounting post 175 which engages slot 176 and also mounting post 177 which engages slot 178. J-slot 180 in push bar 130 is effective to accomplish the initial acceptance of rotation of sector gear 120 without linear motion of 130 as is illustrated between FIGS. 12 and 13. That is, as sector gear 120 is rotated from its position shown in FIG. 12 to its position shown in FIG. 13, crank arm 131 will follow J-slot 180 via mounting pin 181 and the rotatable mounting 142 relative to gear 120. Once arm 131 has reached the position shown in FIG. 13, further rotation of sector gear 120 will cause push bar 130 to move laterally until it reaches the fully loaded position shown in FIG. 14. In this position, notch 182 in push bar 130 will accommodate mounting pin 142 in a configuration so that crank arm 131 is substantially aligned with push bar 130.

Pins 183 and 184 cooperate with finger 185 of crank arm 131 as shown in FIGS. 13 and 14. In FIG. 14, pin 183 insures that crank arm 131 will not inadvertently move relative to J-slot 180 while the machine is in operation. Conversely, pin 184 is arranged so as to provide a disengaging force to finger 185 of push bar 131 when the apparatus is being operated in the unloading sequence of FIG. 14-FIG. 12. A resilient spring arm 186 is mounted on the same post as combination gear 121 but does not rotate with gear 121. As shown in FIG. 13, spring 186 engages the edge of crank arm 131 as it is following the upper curvature of J-slot 180 so as to insure that it will follow the proper channel in moving push rod 130 and will not release prematurely from movement in J-slot 180 which could cause interference between spindle assembly 111 and the tray.

The linear movement of push arm 130 is for the purpose of effecting operation of camming assembly 135 for spindle 111. The exemplary components of assembly 135 are shown in an exploded view in FIG. 15, it being understood that there are two plates such as 190 on each side with these plates both having matched cam grooves 191 therein. The two plates are attached by bars 192 and 193 with bar 192 being engaged by the hook arrangement 188 of push bar 130 [note FIG. 12]. Cam slot 191 is arranged to accept pin 194 which extends laterally on base 208 of spindle assembly 111 on the opposite side from extension pin 195. The slope of slot 191 is arranged so as to have a relatively large angle 196 for the initial portion and a more gentle slope 197 for the final portion so that assembly 111 is urged upward at a more rapid rate while passing over segment 198 of slot 191 and more slowly during segment 199.

Spindle assembly 111 is arranged to fit over mounting bar 200 which is affixed to base plate 201. Thus bar 200 will prevent rotation of assembly 111 as it moves up and down in response to cam slot 191 and its engagement with pin 194 as well as the matching plate similar to 190 which engages pin 195. The base plate 201 has a side plate 202 with a groove 203 to allow pin 194 to be further restrained. A plate similar to 202 with a similar groove 203 is mounted as shown by dotted line 204 although omitted from FIG. 15 for clarity. Restraining members 205 and 206 are actually affixed to the frame of the receiver so that they are oriented around bearing housing 207 and base 208 for assembly 111. Plates 205 and 206 may be formed as a part of the base frame 100, their orientation relative to plate 201 being indicated in dotted lines at respective positions 209 and 210. Note that plate 202 and the plate which would be attached to 201 at 204 can likewise be formed as part of the base frame for receiver 100 along with 205 and 206.

FIG. 16 shows the elements of spindle assembly 111 in greater detail. Base 208 has a groove 211 which is entered by pins 194 and 195 so as to retain the bottom portion of spring 212, the other end 227 being retained by spring clip 213. Bearing housing 207 extends downward through base 208 and has a central bore 214 to accept the rod 200 mounted to base plate 201. The bearing includes an inner and intermediate race combination 215 and 216 for retaining the bearings and a resilient cushion 217 between race 216 and outer race 218. This permits a certain amount of flexibility for mount cap 220 which actually engages hub 13 of disc 12. Further, bearing housing 207 is arranged to hold the bearing so as to prevent vertical movement but to allow a certain amount of lateral movement of the bearing and base plate 220 which is force-fit mounted in the bearing. This further facilitates hub alignment. Bore 221 allows plate 220 to accept the guide pin of the upper spindle without interference.

As cam slot 191 [FIG. 15] urges upwardly against pins 194 and 195, the entire assembly of FIG. 16 moves upward. Plate 220 engages the hub 13 of disc 12 and also forces it upwardly. As is shown in FIG. 18, this will ultimately cause the central bore of hub 13 on disc 12 to engage the upper spindle 222. A shank 223 will pass through the hub 13 bore and enter (but not engage) bore 221 in plate 220. Sloped or conical surface 224 on spindle 222 urges the bore of hub 13 into alignment with shoulder portion 225. The continued upward motion of spindle 111 pinches hub 13 against upper spindle plate 226 and, as seen in FIG. 16, forces assembly 220 and 207 downwardly against its spring, thus retaining hub 13 and its engaged position. The tolerances are arranged such that conical section 224 and shoulder section 225 of upper spindle 222 do not engage any portion of lower spindle plate 220 thereby insuring that the hub will be retained in place by the action of spring 227. Motor 228 can then cause disc 12 to rotate and permit it to operate with read-write head 230 as discussed in our prior application Ser. No. 464,054. Since head 230 extends through slot 231 in base plate 233, brush arm assembly 110 is arranged so as to pass over head 230 in both the loading and unloading motion of magnet assembly 106 and 107. Note also that hole 112 is arranged to permit access to head 230 without disassembly of the machine thus permitting further cleaning of head 230 to remove contaminants which are not removed by the brush assembly 110.

FIG. 17 illustrates the apparatus for providing the delay required for insuring that disc 12 has settled back on tray 11 when spindle assembly 111 has been dropped during the unloading operation. To this end, spring arrangement 240 has a resilient arm comprised of a gently sloped leading surface 241 and an abutting surface 242. Thus, as lever arm 102 is moved from the left to the right in FIG. 17, it will pass over arm surface 241 and not be prevented from movement thereby accommodating loading operations without requiring any delay. Conversely, when arm 102 is returned in the unloading direction, it will engage surface 242 and require movement into slot 244 via its spring mounting on gear 120 and thence further motion to the left into the position indicated at 245 at which point it must be pushed downwardly against the lever arm of 240 before further motion to the left in slot 103 can be accommodated. It has been found in manually operable devices such as this that the so-called umbrella effect of the flexible disc 12 in dropping downward toward the tray can under some circumstances prevent it from becoming fully settled on tray 11 before withdrawing of this tray is attempted by the mechanism. Under those circumstances, the disc 12 could be inadvertently left within receiver 100 housing and damaged by the mechanism. The apparatus shown in FIG. 17 insures that there will be a hesitation in the unloading sequence by the operator and that this hesitation will be sufficiently long to permit the full settling of disc 12 in the tray. To this end, the slots in the tray are shown in our copending application entitled "Flexible Disc Cartridge" further augment this settling operation of disc 12.

FIG. 19 illustrates an arrangement for detecting whether or not a write protection is associated with the disc in the particular cartridge. The reference numerals 50, 98 and 99 coincide directly with their counterparts in our copending application entitled "Flexible Disc Cartridge". Thus, with insert 99 placed in slot 98, microswitch 113 will be actuated as shown and permit both reading and writing of digital data on the surface of disc 12. However, if insert 99 is omitted, the sensing arm for microswitch 113 will be as indicated at 250 and thus microswitch 113 will not be closed and the write enable circuitry [not shown] will not be actuated. Thus, data can be read from disc 12 but no data can be written thereon. Note that this particular sequence provides a more positive failsafe in that a positive step must be taken to insure that insert 99 is present before data can be written on the disc. However, the system can obviously be operated in the opposite manner if so desired.

Reviewing briefly, the phases of a loading sequence of the apparatus shown in response to movement of arm 102 from its position shown in FIGS. 1 and 2 is as follows:

1. The following pin 160 is inserted into the cartridge slot 41 by cooperating with the cam surfaces on the lower side of sector gear 120 thereby releasing the tray latch and fixing the cartridge housing 10 in position.

2. Tray 11 is withdrawn from cartridge 10 by means of the magnetic catches which engage the plates on the face of tray 11 with these magnetic catches being moved laterally by the action of the gear tooth sector on sector gear 120 engaging the combination gear and thence driving the ladder chain gears.

3. The lower spindle 111 is raised through the slide or ramp cam action which moves linearly from the slide arm assembly, the pins in the spindle urging the spring-loaded lower spindle assembly upwards against hub 13 so as to free it from the tray and bring it into aligning engagement with the upper spindle 222.

4. Spindle power and the electronics are enabled by actuation of microswitch 136 thereby starting rotation of the disc 12 and ultimately enabling further data exchange operations therewith.

Some additional loading features include the locking mechanism for preventing the cartridge loading if power is absent via operational solenoid 138, this solenoid requiring continuous energization to prevent it from interfering with rotation of sector gear 120. Additionally, the combination gear and the idler gear cooperate to drive the dual sprocket gears for moving the ladder chain drives in such a manner that the tray is removed with constant motion between the two magnets 106 and 107. Further, the follower pin can be more fully inserted into the cartridge cavity after the tray has been at least partially removed by means of the second camming surface and the spring-loaded follower. The slide or ramp cam is arranged in a graduated configuration so that the spindle 111 can be initially raised quickly but is subsequently raised more slowly as it approaches full spindle engagement of the hub 13. The pin on the slide cooperates with the sector gear crank pin to hold the crank arm in the J-slot for proper alignment. The shoulder stops on the sector gear can be arranged to engage the follower pin to prevent excessive arm 102 travel at either limit of slot 103. The peripheral stub on the sector gear engages the combination gear to insure that the tray is in its fully locked position so that no reverse motion will be imparted to the ladder chain drives and gear teeth alignment. The solenoid pin alignment engages the shoulder stop to prevent unloading of the disc from the spindles until the solenoid has been actuated after the motor drive is stopped. Write protect detection via the notch and insert sensing of microswitch 113 can be included.

Again reviewing the phases of the unload sequence operation in moving the arm 102 from the opposite side of slot 103 as shown in FIG. 2 includes:

1. The spindle drive is deactivated by the ramp slide assembly 135 moving slightly toward the front of the receiver 100. This does not permit the spindle to be disengaged but does remove power from the drive motor 228.

2. Spindle 111 is lowered and hub 13 is re-nested on tray 11 via the linear motion of sliding ramp cam assembly 135.

3. The tray 11 is reintroduced into cartridge envelope 10 through the re-engagement of sector gear 121 by gear tooth segment 143 causing opposite motion of magnetic assemblies 106 and 107 from the loading motion.

4. The tray is locked into cartridge 10 and the cartridge released from the receiver by the follower pin being forced back out of the cartridge slot 41 allowing spring arm catch 45 on tray 11 to re-engage cartridge slot 41.

Additional unloading features include the timeout arrangement for allowing the spindle to stop rotating before actuating the solenoid, thereby preventing the spindle release of disc 12 until all rotation of disc 12 has stopped. Still further unload features include the spring arm biasing of the crank arm 131, the releasing "kick" of pin 184, the mechanical unload delay from catch 240, the downward camming of follower 160 flush with the interior of cartridge 10, the limit stop for arm 102 travel and the biasing of the combination gear into its full unload position by the sector gear spring and combination gear pin cooperation.

Figure 20:
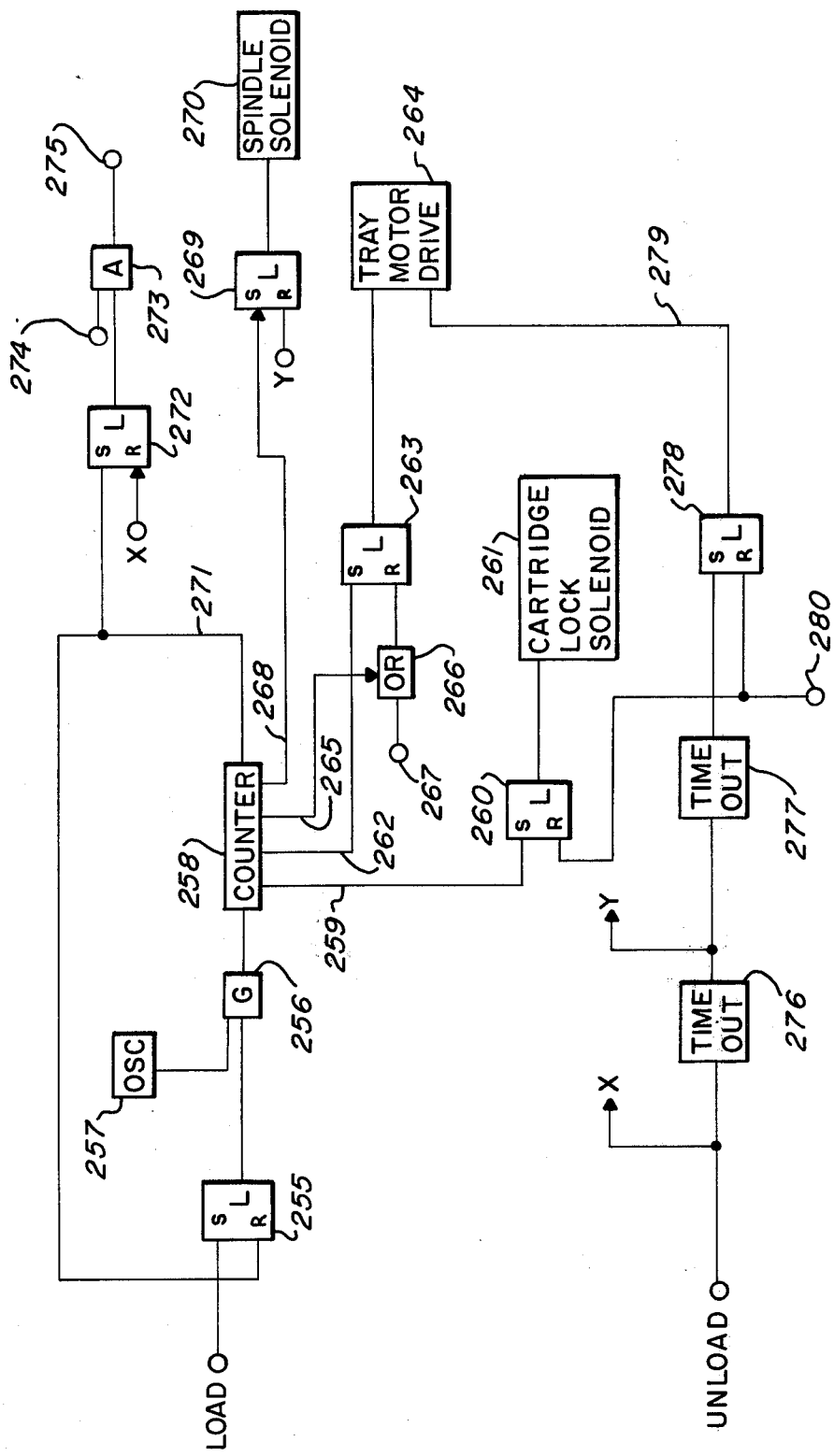
FIG. 20 is a block diagram of an arrangement for implementing the invention in an electronic embodiment.

FIG. 20 illustrates one potential arrangement of electronic circuitry for effecting the same loading and unloading operations performed by the mechanisms of the apparatus in the preferred embodiment described previously. Manual actuation of a load button after cartridge 10 is inserted effects the setting of latch 255 which thus partially enables gate 256 to pass timing pulses from oscillator 257 into counter 258. As an initial count stage is reached, counter 258 produces output 259 which sets latch 260 and thus actuates the cartridge lock solenoid 261 to provide the same locking function performed by pin 160. Note that the output of gate 256 could be used for setting of latch 260 if desired. In any event, the tray latch will be released and the housing for cartridge 10 retained as previously described as a result of actuation of solenoid 261.

Subsequently, a higher order count will be produced at 262 from counter 258 so as to set latch 263 and actuate the tray motor drive 264 which would be coupled for moving magnet assemblies 106 and 107 as also previously described. This effects the removal of tray 11 from cartridge housing 10. Eventually, the tray will be completely removed and higher order count 265 will occur after a sufficient length of time. This causes the resetting of latch 263 via OR circuit 266. If desired, a position detector switch can be used to provide input 267 to reset latch 263 when the tray has been completely removed from the cartridge. A still higher order count 268 thereafter sets latch 269 and engages a spindle solenoid 270 to raise spindle assembly 111 into its proper engaging relation without the need for the ramp cam assembly described previously. It may be desirable to use a slow actuating solenoid arrangement for 270 particularly for the unloading operations to be discussed later. Finally, counter 258 will carry as indicated by output 271 which thus clears latch 255 and sets latch 272 thereby partially enabling AND circuit 273. A disc position detector provides an input at 274 to complete the conditioning of AND 273 to provide the run signal 275 for the drive motor to spin the disc and also to enable the other electronics. Signal 274 could be provided by a conventional photodetector circuit detecting that spindle assembly 111 has raised sufficiently to insure proper engagement of the disc hub.

For the removal of the disc from the receiver, a manual unload signal is provided which introduces an input to timeout circuit 276 which can be a conventional single-shot circuit or the like. This unload signal is also coupled at "X" to provide the reset for latch 272 and thus drop power from the disc spin motor. Timeout 276 is arranged to provide a sufficient delay from the time of its input to the time of its output so that the spinning of the disc 12 will have completely stopped before output "Y" is produced which rests latch 269 and causes spindle solenoid 270 to be deactivated. This returns the disc 12 to its nesting position in tray 11. Signal "Y" also provides an input to a second timeout circuit 277 which provides a sufficient delay between its input and output to insure that the disc has properly reseated on the tray. The output of timeout 277 sets latch 278 which produces an output 279 as a result to cause tray motor drive 264 to operate in the reverse direction resulting in the return of tray 11 into cartridge 10. A detector switch such as a microswitch or the like provides input 280 when the tray has been completely returned to the cartridge and thus resets latch 278 stopping the tray motor drive and also resetting latch 260 so that the cartridge lock solenoid 261 will be deactuated releasing the lock pin 160 from the cartridge housing and relocking tray 11 to the cartridge housing as described previously.

Various other functions and arrangements will be readily apparent. For instance, it may be desirable to provide an interlock between the load and unload operations which could be easily effected by disabling the unload input by the set output of latch 255 or the like. This would insure that the load sequence is completed prior to commencement of an unload sequence. Note that timeout 277 effectively performs the same general operation as the mechanical delay circuit illustrated in FIG. 7.

Still further, note that various combinations of the mechanical and electronic embodiments are readily apparent. In addition, the manual handle 102 could easily be replaced with a motor drive directly coupled to sector gear 120 and appropriate load/unload selector buttons. It should be recognized that the mechanical embodiment described for FIGS. 1–19 is particularly advantageous in that it can be manufactured with relatively loose tolerances using inexpensive components and procedures. The receiver frame can be molded in one piece with many of the elements shown as separate units actually being molded as a unit with the frame. The only elements which require reasonably accurate placement are the mounting shafts for gears 120, 121, 122 and 123 relative to each other since they must locate those gears for proper meshing. However, those gears can be fabricated using low-cost plastic molding techniques because they do not encounter significant mechanical loading during use.

Although the preferred embodiments of this invention have been described in considerable detail hereinbefore, various other modifications, changes and additions will be readily apparent to those having normal skill in the art without departing from the spirit of this invention.

What is claimed is:

1. Apparatus for cooperating with a disc cartridge wherein said cartridge includes an exterior envelope housing and a tray which is received within the housing and retained therein by a releasable latching means with engaging means on one edge of the tray which edge completes the cartridge exterior in conjunction with the envelope housing, the tray being arranged for holding the disc via a hub nested in a port in the tray, said apparatus comprising:
a frame having means for receiving the cartridge,
means for releasing the latching means of the cartridge and for retaining the cartridge housing relative to said frame,
means for withdrawing the tray from the cartridge housing including means for attaching to the tray engaging means when the cartridge is received by said frame receiving means,
means for displacing the disc hub from the tray, and
means for imparting rotary motion to the displaced disc hub so that the disc rotates free of the tray and said frame.

2. Apparatus in accordance with claim 1 wherein said withdrawing means includes means operable subsequent to said releasing means for moving said attaching means in the plane of the tray.

3. Apparatus in accordance with claim 2 wherein the engaging means on the tray includes two ferromagnetic plates located at the outer means of the exterior edge of the tray, said attaching means including two magnet means each arranged for magnetically attaching to a respective tray plate when the cartridge is received by said frame receiving means.

4. Apparatus in accordance with claim 2 which further includes a head mounted relative to said frame for receiving information from the disc while it is rotating, and means coupled to said moving means for brushing said head as said withdrawing means causes the disc to move relative to the cartridge.

5. Apparatus in accordance with claim 1 wherein the tray hub has a bore therethrough, said displacing means including first and second spindle means and means operable subsequent to said withdrawing means for moving one of said spindle means through the tray port for clamping the disc hub between said spindle means in a position spaced from the tray, one of said spindle means having a shaft with a shoulder of the same size as the hub bore and a substantially conical tip, said one of the spindle means being arranged to initially engage the tray bore and urge it into aligning engagement with said shoulder.

6. Apparatus in accordance with claim 1 wherein said displacing means includes first and second spindle means and means operable subsequent to said withdrawing means for moving one of said spindle means through the tray port for clamping the disc hub between said spindle means in a position spaced from the tray, said rotary motion imparting means including a drive motor attached to at least one of said spindle means, and means operable subsequent to said spindle moving means for applying operating power to said drive motor.

7. Apparatus for cooperating with a disc cartridge wherein said cartridge includes an exterior envelope housing and a tray which is received within the housing by a latching means and which is arranged for holding the disc via a hub nested in a port in the tray, said apparatus comprising:
a frame having means for receiving the cartridge,
means for releasing the latching means of the cartridge and for retaining the cartridge housing relative to said frame,
means for withdrawing the tray from the cartridge housing,
means for displacing the disc hub from the tray,
means for imparting rotary motion to the displaced disc hub so that the disc rotates free of the tray and said frame, and
means operable while rotary motion is applied to the disc by said imparting means for preventing said displacing means from returning the disc hub to the tray.

8. Apparatus for cooperating with a disc cartridge wherein said cartridge includes an exterior envelope housing and a tray which is received within the housing by a latching means and which is arranged for holding the disc via a hub nested in a port in the tray, said apparatus comprising:
a frame having means for receiving the cartridge,
means for releasing the latching means of the cartridge and for retaining the cartridge housing relative to said frame,
means for withdrawing the tray from the cartridge housing,
means for displacing the disc hub from the tray, said displacing means being adapted for returning the disc hub to the tray,
means for imparting rotary motion to the displaced disc hub so that the disc rotates free of the tray and said frame, and
means operable after said displacing means returns the hub to the tray for preventing said withdrawing means from returning the tray into the cartridge housing until the disc has seated on the tray.

9. Apparatus for cooperating with a flexible disc cartridge which has an exterior envelope housing and a tray for retaining the disc via a hub mounted on the disc which nests within a port through the tray, the tray having an outer edge which completes the cartridge enclosure in conjunction with the housing and further has latching means mounted thereon which protrudes into a slot in the envelope housing to lock the tray within the housing, said apparatus comprising:
a frame having a slot for receiving the cartridge,
a sector gear mounted on said frame for rotation between an idle position, an initial position and first and second actuation positions,
means for rotating said sector gear between said positions,
biased arm means mounted on said frame relative to a cartridge when received in said frame slot for forcing an arm into the cartridge housing slot whenever said sector gear is in said initial position and said first and second actuation positions for releasing the tray latching means and retaining the cartridge housing in a substantially fixed position relative to said frame,
tray handling means for engaging the exterior edge of the tray and moving the tray in the plane of the disc between the cartridge housing and an operating position within said frame in response to rotation of said sector gear through said first actuation position so that the tray is in the operating position whenever said sector gear rotates between said first and second actuation positions,
hub clamping means,
means responsive to rotation of said sector gear through said second actuation position for moving the disc hub between the tray port and said hub clamping means, and
means for selectably applying rotary motion to the disc whenever the hub is held by said hub clamping means.

10. Apparatus in accordance with claim 9 which further includes delay means operable whenever said sector gear is rotated from said second actuation position toward said first actuation position for preventing entry thereof into said first actuation position until sufficient time has passed to insure that the disc is fully returned to its storage position on the tray.

11. Apparatus in accordance with claim 10 wherein said means for rotating said sector gear includes an arm radially attached to said sector gear, said delay means including a tooth resiliently biased into the path of travel of said radial arm and having a sloped surface which is engaged by said arm when moving said sector gear from said second to said first actuation position and a second surface for blocking movement of said arm when moving said sector gear from said second to said first actuation position, and means for removing said tooth from blocking movement of said radial arm.

12. Apparatus in accordance with claim 11 wherein said removing means comprises a biased attachment of said radial arm to said sector gear for permitting sufficient movement of said radial arm relative to the axis of said sector gear in opposition to the biasing of said arm thereby to clear said tooth.

13. Apparatus in accordance with claim 9 wherein said sector gear has a first cam surface extending from said initial position and a second cam surface extending throughout the remainder of said second actuation position, said biased arm means being engaged by said first cam surface to force the said arm thereof into the cartridge housing slot until the end of said arm is flush with the inner surface of the housing wall containing the slot, said biased arm means being engaged by said second cam surface for forcing the said arm thereof into the interior cavity of the cartridge housing.

14. Apparatus in accordance with claim 9 wherein said tray handling means includes means for attachably engaging the outer corners of the exterior edge of the tray, and means responsive to movement of said sector gear through said first actuation position for applying equal moving forces to the said outer corner engaging means.

15. Apparatus in accordance with claim 14 wherein the tray has ferromagnetic plates mounted on the corners of the exterior edge thereof, said attachably engaging means including a pair of magnet means arranged for magnetic attachment to respective ones of the tray plates, said first actuation position of said sector gear including a segment of gear teeth, said tray handling means further including a pair of rotary to linear motion converters each attached to linearly move a respective said magnet means, and means actuated by said gear teeth segment for applying equal rotary forces to said converters.

16. Apparatus in accordance with claim 9 wherein said disc hub moving means includes means for converting the rotary motion of said sector gear through said second actuation position to a linear motion, spindle means mounted for preventing movement thereof in the plane of the disc for permitting motion thereof in the direction perpendicular thereto, and cam means responsive to the linear motion from said converting means for moving said spindle means in said perpendicular direction.

17. Apparatus in accordance with claim 16 wherein said hub clamping means includes a plate mounted on said spindle means for passing from a position below the tray and through the port for clamping the hub in a position above the tray surface in response to said cam means movement.

18. Apparatus in accordance with claim 17 wherein said rotary motion applying means includes a motor having an extended shaft with a shoulder to fit within a bore through the hub and a substantially conical tip for urging the hub bore into alignment with the shoulder, said hub clamping means further including a plate attached to said shaft and resilient biasing means for mounting said spindle means plate, whereby the disc hub is held between said plates by the force of said resilient biasing means whenever said cam means has moved said spindle means at the limit of its movement above the tray.

19. Apparatus in accordance with claim 16 wherein said spindle means has at least one follower pin extending therefrom, said cam means including a plate for moving in the direction of the linear motion, said plate being arranged perpendicular to the plane of the disc and having a sloped slot therein for moving said follower pin in a plane perpendicular to the plane of the disc.

20. Apparatus in accordance with claim 19 wherein said sloped slot has a graduated curvature for more slowly moving said pin at the hub clamping end of the movement thereof relative to the initial movement of said pin for a given velocity of linear movement of said plate.

21. Apparatus in accordance with claim 20 wherein said cam means includes two said plates, and said spindle means has a pair of said follower pins on opposite sides thereof for engagement with said sloped slots of respective said plates.

22. Apparatus in accordance with claim 9 which further includes means operable subsequent to said rotary motion applying means for preventing said sector gear from being rotated through said second actuation position until the rotary motion of the disc has stopped.

23. Apparatus in accordance with claim 22 wherein said preventing means includes a solenoid means engaging a slot in said sector gear whenever deactuated for preventing substantial rotation of said sector gear, means for deactuating said solenoid means whenever said rotary motion applying means is operating and for a sufficient time period thereafter to insure that the disc is no longer rotating.

24. Apparatus in accordance with claim 9 wherein said sector gear includes a third actuation position, said rotary motion applying means including switch means operable for applying rotary motion to the disc when said rotating means has moved said sector gear to the end of said third actuation position.

25. Apparatus in accordance with claim 24 which further includes means operable in response to actuation of said switch means for preventing movement of said sector gear from said third actuation position into said second actuation position until sufficient time has passed for the disc to stop rotating.

26. Apparatus in accordance with claim 9 which further includes means for preventing movement of said sector gear from said initial position into said first actuation position in the absence of power for operating said rotary applying means.

* * * * *

UNITED STATES PATENT OFFICE
CERTIFICATE OF CORRECTION

Patent No. 3,959,823    Dated May 25, 1976

Inventor(s) Robert F. Heidecker et al

It is certified that error appears in the above-identified patent and that said Letters Patent are hereby corrected as shown below:

IN THE ABSTRACT:

Line 14, cancel "operaton" and substitute --operation--.

Column 5, line 9, cancel "alightly" and substitute --slightly--.
Column 10, line 38, cancel "and" and substitute --in--.

IN THE CLAIMS:

Column 17, line 26, after "disc" add --but--.

Signed and Sealed this

Ninth Day of November 1976

[SEAL]

Attest:

RUTH C. MASON
Attesting Officer

C. MARSHALL DANN
Commissioner of Patents and Trademarks